United States Patent [19]
Armstrong et al.

[11] Patent Number: 5,242,251
[45] Date of Patent: Sep. 7, 1993

[54] BROACH AND PROCESS OF MANUFACTURING A BROACH

[75] Inventors: Harold F. Armstrong, Milford; Bruce K. Bakaian, Wilton, both of N.H.

[73] Assignee: Cutting Tool Technologies, Inc., Wilton, N.H.

[21] Appl. No.: 834,135

[22] Filed: Feb. 7, 1992

[51] Int. Cl.$^5$ .................. B23D 43/04; B23P 15/42
[52] U.S. Cl. .................. 407/15; 76/101.1; 407/18
[58] Field of Search .................. 407/13, 15, 18, 19; 76/101.1; 409/243

[56] References Cited

U.S. PATENT DOCUMENTS

| | | | |
|---|---|---|---|
| 2,730,793 | 1/1956 | Anthony et al. | 76/101.1 X |
| 3,461,748 | 8/1969 | Meyer | 76/101.1 |
| 4,740,115 | 4/1988 | Hertel et al. | 407/15 |
| 4,801,226 | 1/1989 | Gleason | 409/244 |
| 4,993,889 | 2/1991 | Kelm | 407/15 |

FOREIGN PATENT DOCUMENTS

| | | | |
|---|---|---|---|
| 132921 | 8/1982 | Japan | 407/15 |
| 1641530 | 4/1991 | U.S.S.R. | 407/15 |

*Primary Examiner*—Steven C. Bishop
*Attorney, Agent, or Firm*—Hayes, Soloway, Hennessey & Hage

[57] ABSTRACT

A broach has replaceable cutting inserts. The inserts are supported to have equal hook and rake angles of about 11° to 14°. A method of producing the broach in a simplified milling setup is described.

12 Claims, 8 Drawing Sheets

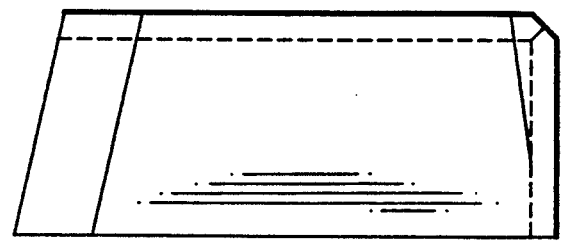
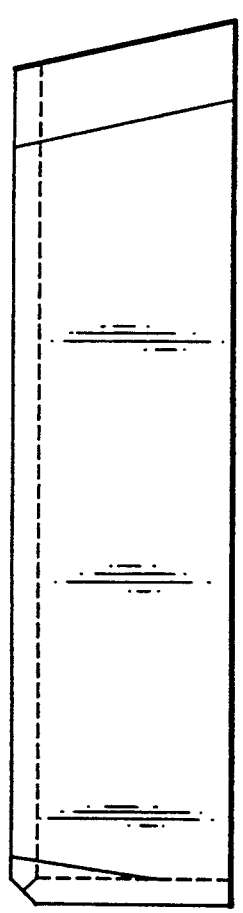
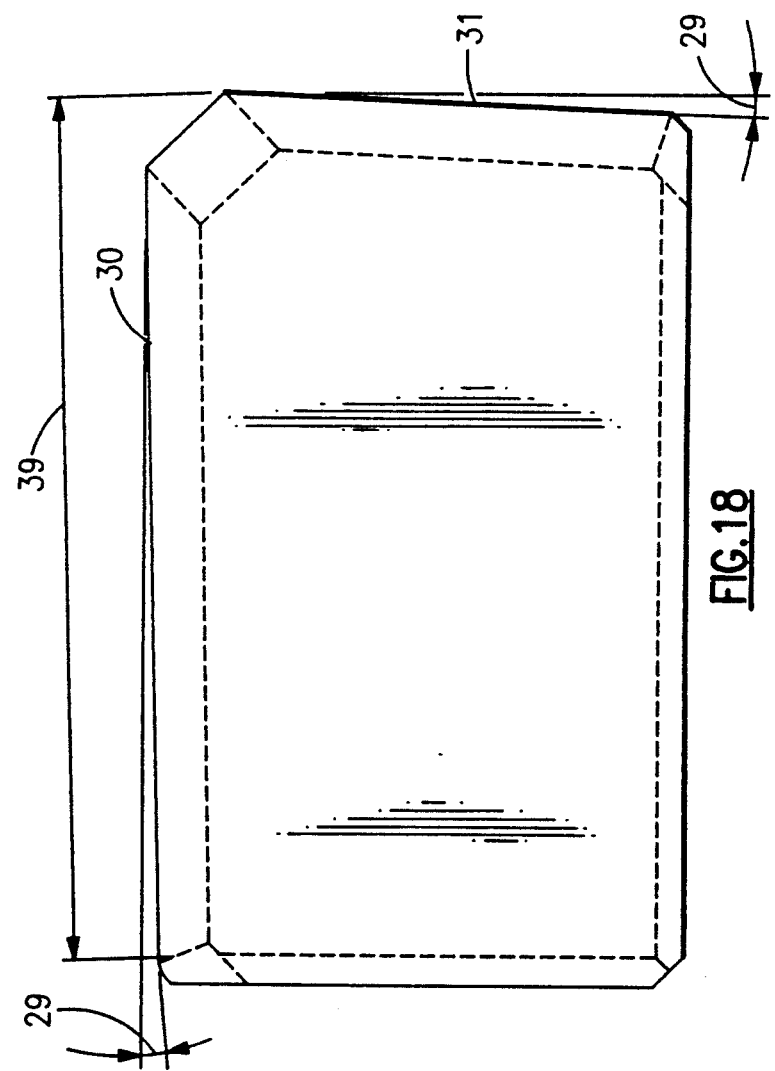

BROACH AND PROCESS OF MANUFACTURING A BROACH

FIELD OF THE INVENTION

The invention relates to a broach which is designed for roughing blade root forms in turbine discs and similar types of broach slotting operations.

BACKGROUND OF THE INVENTION

High speed steel broaches are a common cutting tool in many types of metal working applications.

The application of pre-sharpened disposable cutting inserts to broaches in general has been very limited. In the case of roughing the blade root forms in turbine wheel discs, it has been virtually non-existent. This invention is intended to address the application of pre-sharpened disposable cutting insert broaches to turbine wheel discs and other uses. It is further the intent of the invention to accomplish this in a most economical way, through initial low cost of the broach and its improved operating efficiency, by virtue of much lower machining times and lowered tool maintenance costs.

Standard positive rake indexable inserts usually allow only 5°–8° rakes. However, somewhat higher positive rakes are much more suited to the special metals used in turbine discs.

Few broaching operations require the deep slotting associated with turbine discs. This deep slotting necessitates a series of many broach holders, making the total broach assembly extremely long with lengths occasionally reaching 100 feet or more. This extreme length does not allow the luxury of providing one series of inserts for cutting the slot bottom and a separate series for the slot walls, as is the case with crank shaft pin diameter broaching. (Reference U.S. Pat. No. 4,740,115)

BRIEF DESCRIPTION OF THE INVENTION

The above problems are solved in the present invention by using inserts with staggered tooth configuration using about 11°–14° positive side rakes, and about 11°–14° hook angles. It is also preferred that the inserts have approximately 2° to approximately 3½° inward taper, with each pair of right-hand and left-hand pre-sharpened disposable inserts cutting both the slot bottom and side wall of the part with a very free cutting action.

A particular benefit of the staggered side rake configuration is that the length of the chip is distinctly shorter than the width of the slot being broached. This makes the chip more manageable. The higher positive side rake also tends to steer this shorter chip toward the center of the broach and away from the sidewall of the cut.

The very free cutting action consequent to the higher positive rakes and inward taper result in a very prolonged edge life for still further operating economy.

Extraordinary economy and accuracy in the manufacture of the broach holder is achieved by virtue of the insert's side taper.

The usual inserts have a width that differs from their height.

DESCRIPTION OF THE DRAWINGS

(FIGS. 1, 2, and 3 are of the same scale. FIGS. 4 through 25 are 10 times the scale of FIGS. 1, 2, and 3.)

FIG. 1 is a top view.

FIG. 2 is a side view.

FIG. 3 is a rear-end view taken in the direction of arrow A showing the broach in relation to a groove to be cut in a workpiece.

FIG. 4 is an enlarged side view of a typical right-hand station showing the wedge and screw arrangement of this invention, taken in the direction of arrow B relative to Line 18, FIGS. 1 and 2.

FIG. 5 is similar to FIG. 4 except without the inset, wedge, and screw.

FIG. 6 is similar to FIG. 4 except showing an example of a conventional wedge and screw arrangement for comparison.

FIG. 7 is an enlarged plan view of a typical station, taken in the direction of arrow C, FIG. 2.

FIG. 8 is an enlarged right-hand station side view taken in the direction of arrow F, FIGS. 1 and 2 and oriented with the hook face, Line 18 in the vertical plane.

FIG. 9 is an enlarged frontal view of a right-hand station taken in the direction of arrow G, FIG. 1.

FIG. 10 is an enlarged frontal view taken in the direction of arrow G, FIG. 1, showing how both the right-hand and left-hand teeth of a pair of teeth are at the same height in this invention.

FIG. 11 is similar to FIG. 10 except to show a conventional uniform rise per tooth as an example for comparison.

FIGS. 12, 13 and 14 are enlarged views of a typical uni-handed inset as used in this invention.

FIGS. 15, 16 and 17 are enlarged views of a typical right-hand insert for broaches too narrow for a uni-handed insert as used in this invention.

FIGS. 18, 19 and 20 are enlarged views of a typical right-hand insert for broaches too wide for use of a uni-handed insert as used in this invention.

DETAILED DESCRIPTION OF THE INVENTION

Figure 1:
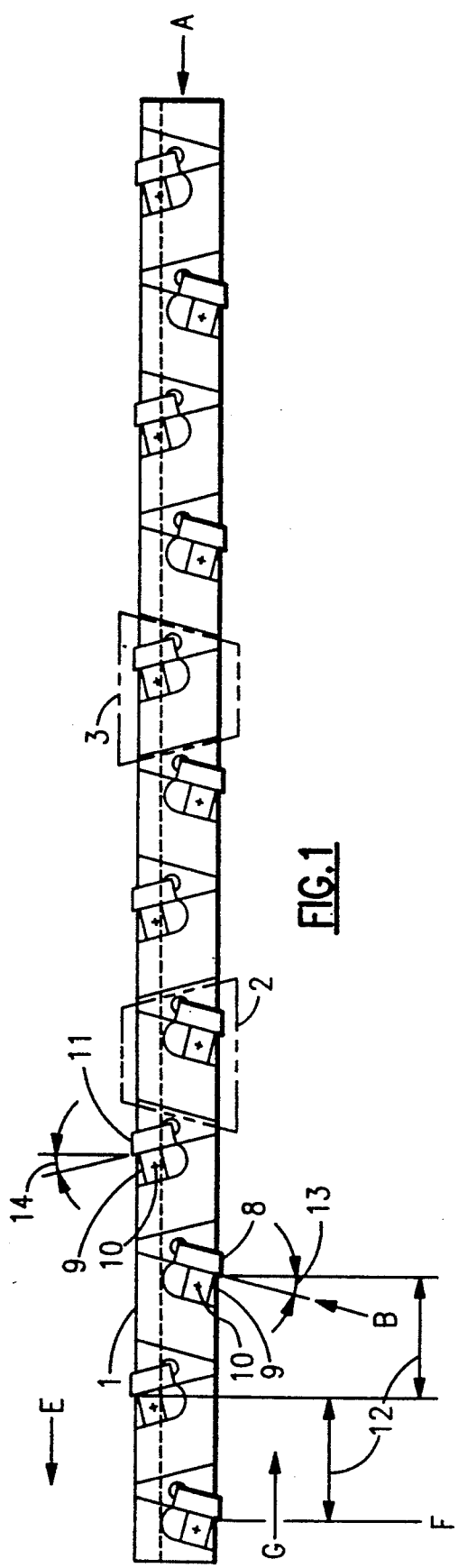
FIGS. 1 and 2 are diagrammatic schematic views of a partial broach assembly that typify a preferred embodiment of the invention. Note that the holder lengths are abbreviated for clarity.
Figure 2:
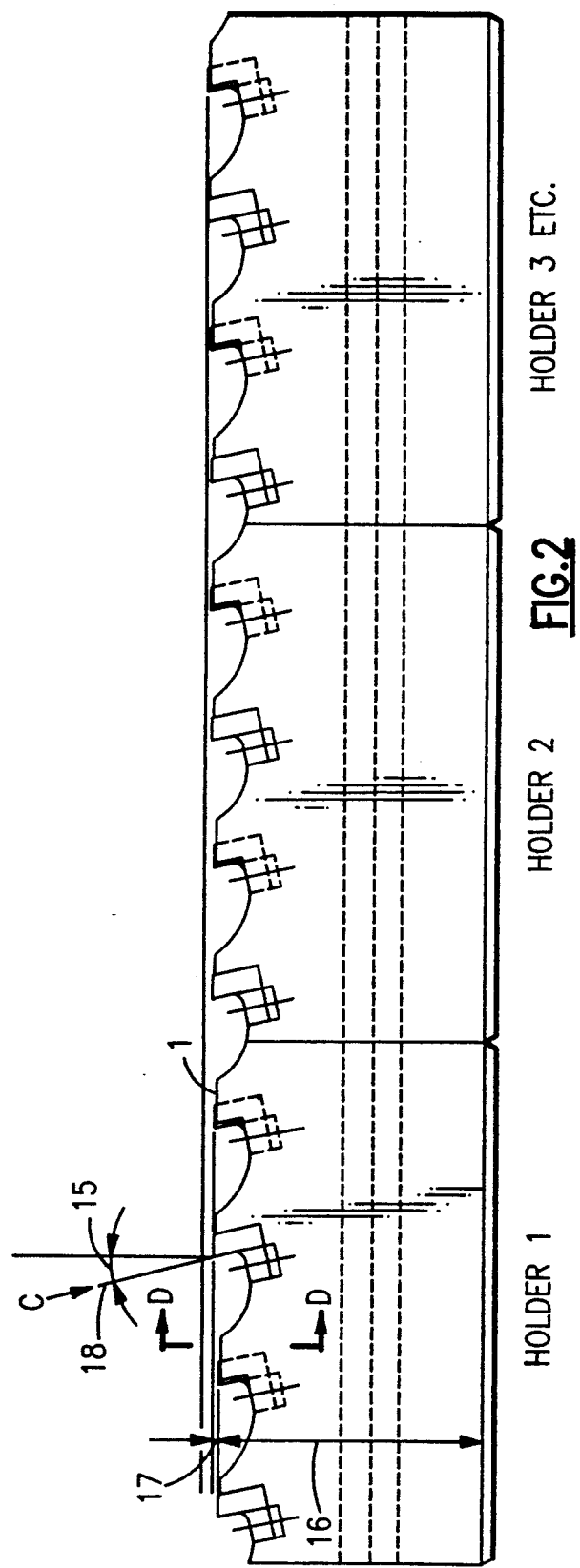
Figure 5:
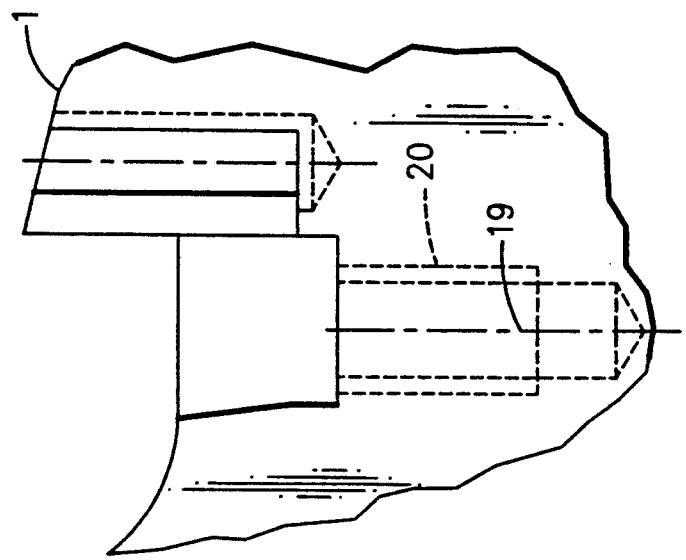
Figure 3:
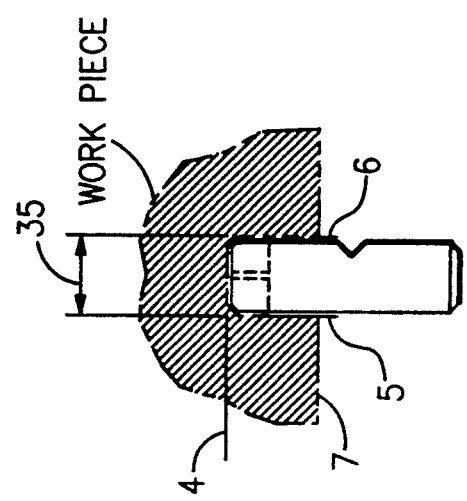

Referring to FIGS. 1, 2 and 3, a broach assembly comprises one or more holders 1 with a cut direction of arrow E. Each holder 1 has a series of staggered right-hand and left-hand stations 2 and 3 respectively, cutting both the bottom 4 and side walls 5 and 6 of the work piece 7 (see FIG. 3). Each right-hand station 2 contains a disposable pre-sharpened insert 8, a wedge 9 and a holding screw 10. Each left-hand station 3 contains a similar disposable pre-sharpened insert 11, a wedge 9, and a holding screw 10. The stations typically are uniformly staggered on a pitch 12, between ⅜ inch and 2 inches. A right-hand side rake 13 is between 11°–14° and a left-hand side rake 14, is preferably at the same angle as its right-hand counterpart.

Referring to FIG. 2, a positive hook angle 15 is shown as between 11°–14°.

Figure 4:
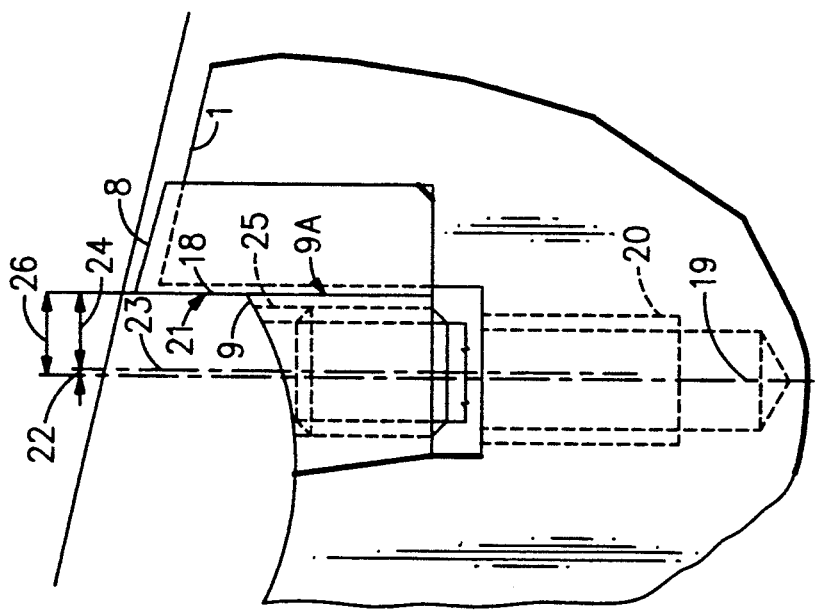
Figure 7:
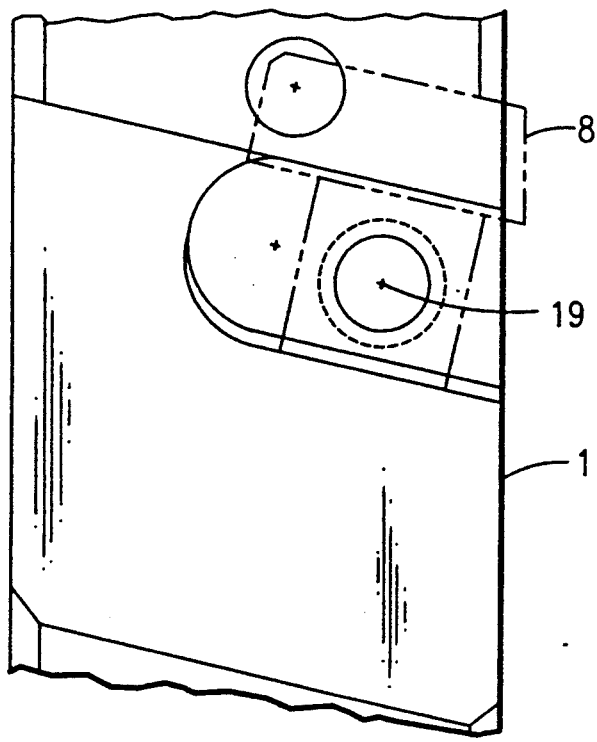

Referring now to FIG. 4, the holder 1, during machining, is preferably tilted by the same amount as is the hook angle 15 so that the hook plane 18 is then oriented in the vertical plane. This provides for simplified milling and permits all inserts to be milled in a single set up with a milling cutter having a milling face parallel to the milling cutter axis. As can be seen by reference to a station side view in FIG. 4 and to a station plan view in FIG. 7 it is relatively simple to mill all the right-hand and all the left-hand stations efficiently and with enhanced accuracy, in just one fixturing.

Another feature of the invention permits simplified station machining for the centerline 19 of the threaded hole 20 which is vertical in FIG. 4. When changing insert 8, a gap must be achieved between the face 18 of the insert 8 and the face 21 (see FIGS. 4 and 12) of the wedge 9. This is accomplished by virtue of the 0.005 inch approximate difference 22 between offset 24 which defines the centerline of the screw hole in wedge 9 and offset which defines the center position of the centerline 19 of threaded hole 20.

Figure 6:
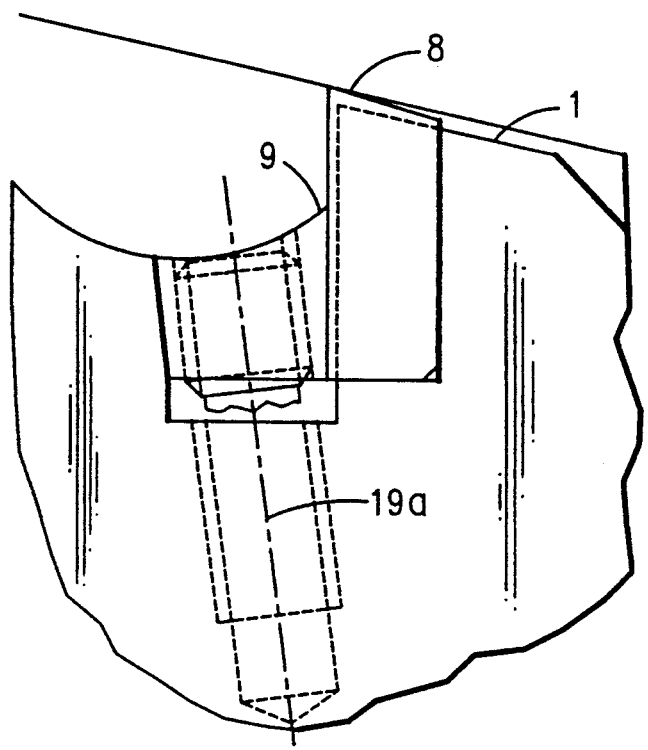

This provides simplicity and economy in the holder's manufacturing process, because of the unique relationship wherein the centerline 19 of the screw in the present invention is parallel with the clamped surface 18 of the insert. In the prior art, (see FIG. 6) this centerline is canted relative to the clamped surface of the insert, the canting usually being the same as the wedge taper angle. This feature of the present invention becomes practical (as shown in FIG. 4) by virtue of the threaded hole 20 in the holder being on a slightly greater offset 26 relative to the insert face, than is the offset 24 to the threaded hole in the wedge 9. This difference in offset predisposes the wedge face 9A to back away from the insert face 21 when the wedge is loosened, allowing the insert 8 to be readily replaced. By using slightly larger than normal thread diameters in both the wedge and holder, the screw is allowed to assume a modest cater-cornered position, thus maintaining proper function, when tightened in place.

Figure 9:
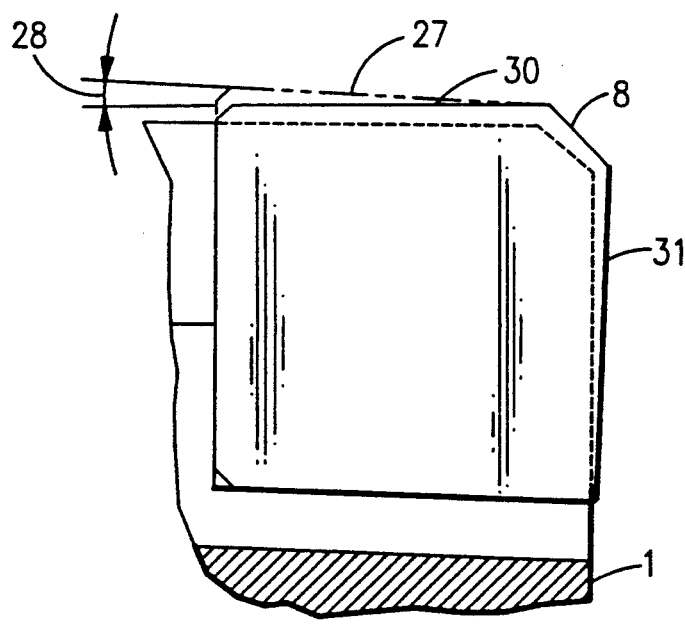

For maximum economy in the broach holder manufacture, the insert pocket is oriented around the hook angle. This orientation, coupled with the side rake, would project the insert's trailing end 27 above the cut line of the broach (see FIG. 9). By adding a correcting side taper 28 on the insert, this projection ("walkout") is eliminated thus allowing the broach to produce a straight cut. Further by adding this same angle to the adjacent side, an inward taper 36 is created up the side of the broach (see FIG. 10).

Figure 8:
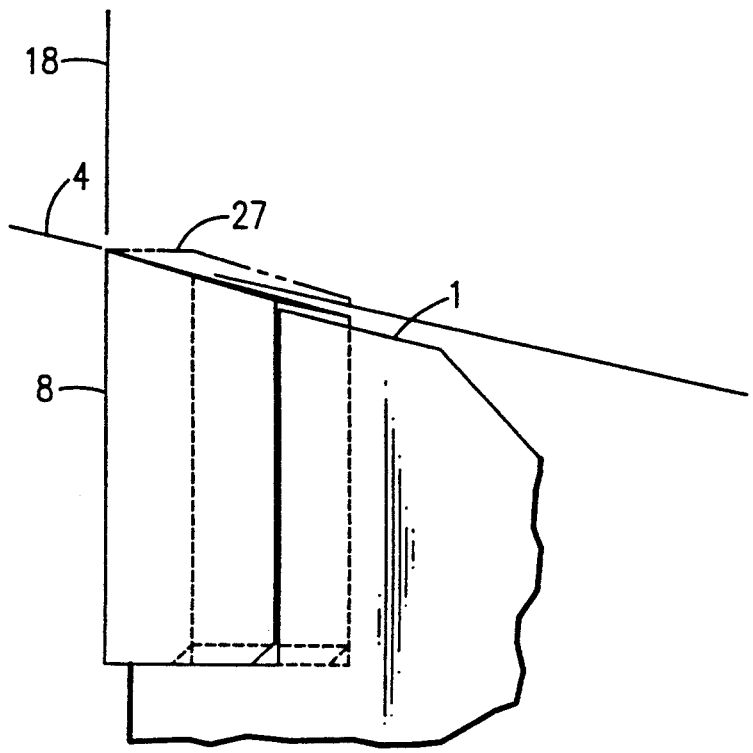
Figure 12:
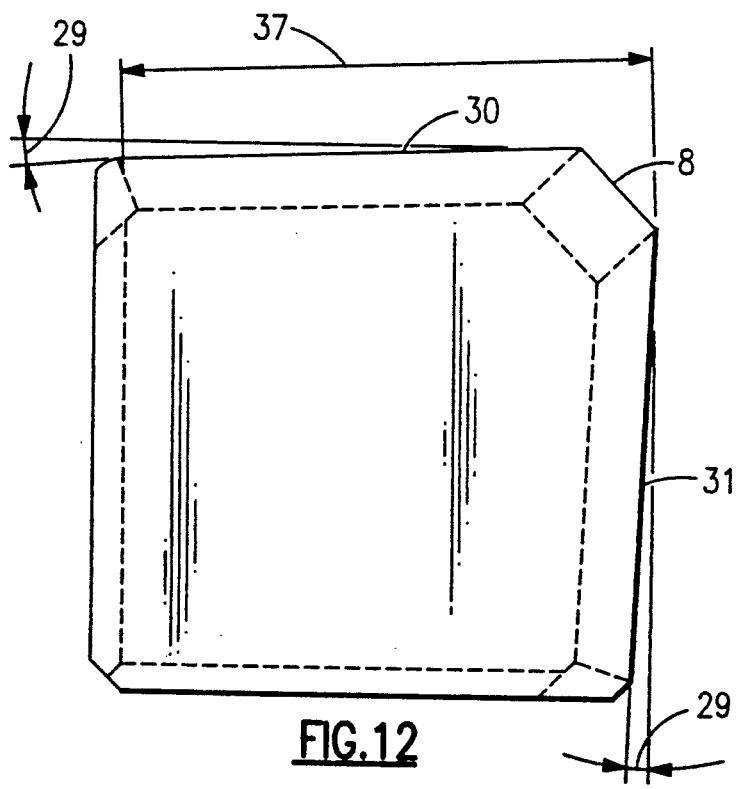
Figure 13:
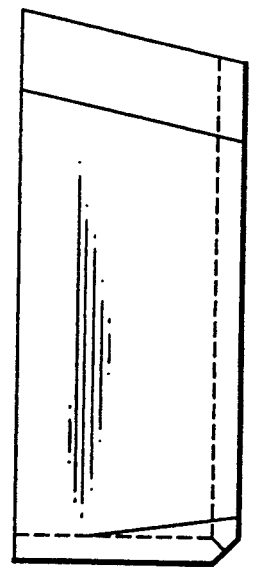
Figure 17:
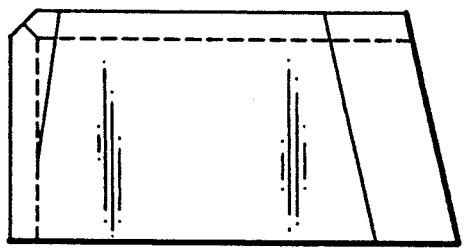

Referring to FIG. 8 the holder 1 is single plane tilted by the same amount as the hook angle 15 so that the hook plane 18 is then oriented in the vertical plane for simplified machining. When the station is machined in this plane, a conventional square or parallelogram insert 8 will "walk-out" from the cut plane 4 as depicted by line 27 in both FIG. 8 and FIG. 9. When the holder is moved during cutting in a direction parallel to that shown in E (FIG. 1). This "walk-out" angle 28, FIG. 9, ranges between approximately 2° for an 11° hook and an 11° side rake to approximate 3½° for a 14° hook and 14° side rake. The methods required to correct for this "walk-out" in the holder can be very complex, time consuming and costly. Referring to FIG. 12 in this invention a correcting side taper angle 29 equal to this "walk-out" angle is added to the insert 8, cutting edges 30 and 31. Thus the cutting edge 30 stays in the straight cutting plane 4 and retains a flat bottom in the slot being broached With this method of fixturing combined with the "walk-out" correcting angle 29 and vertically threaded hole 20 FIG. 4, it then becomes possible to machine all the stations in a holder in one fixturing thus achieving both very low machine times and very close tolerances.

To further enhance chip control, in this invention, the left-hand station is at the same height as its right-hand station mate, in lieu of the conventional practice of the rise per tooth being evenly divided between teeth. This is of particular value when the insert width is substantially greater than one half of the broach cut width. A uniform rise per tooth would, in the overlap area cause the chip to be one-half the thickness of the chip in the non-overlap area. This differential would length, resulting in a loss of directional control over the chip.

Figure 10:
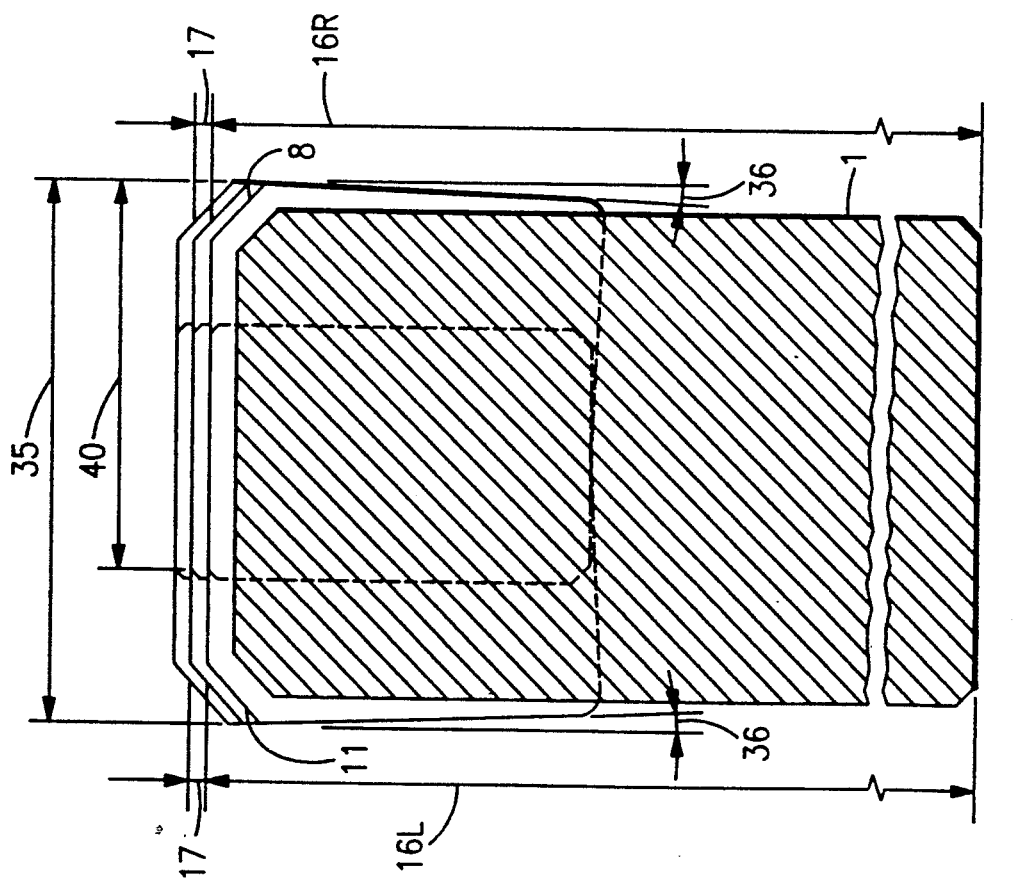
Figure 14:
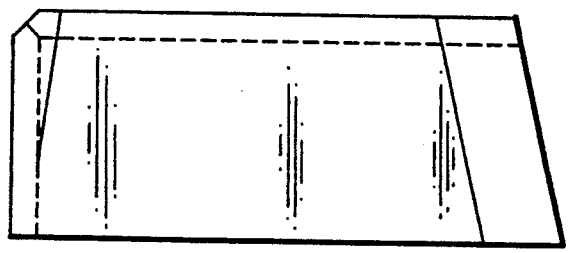
Figure 15:
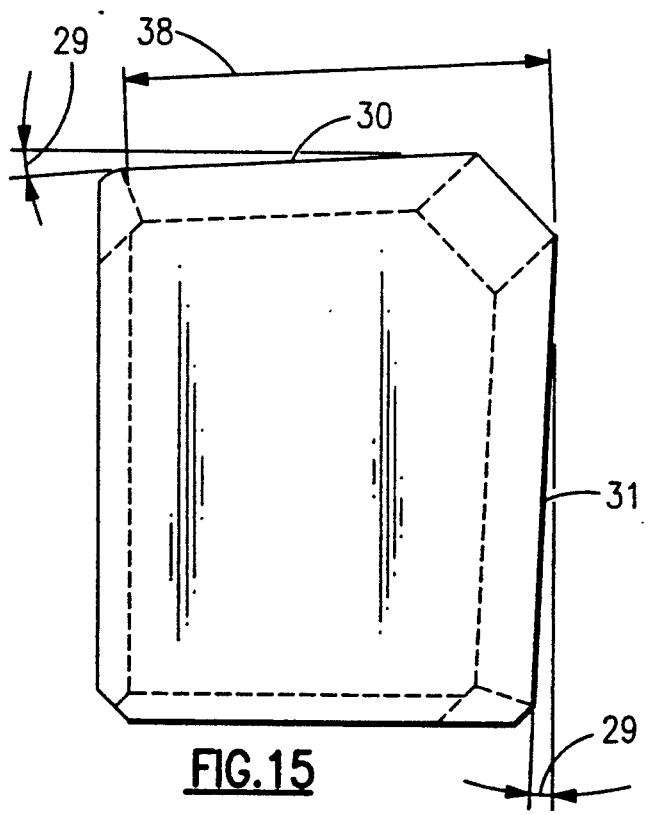
Figure 16:
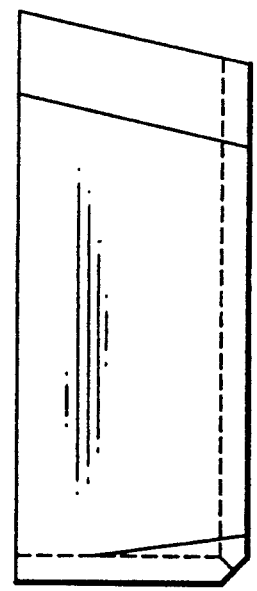

Referring to FIGS. 10, 15, and 18, the side taper 29 FIGS. 15 and 18 is incorporated on side 31 of FIGS. 15 and 18 as well as side 30 so as to provide an inward taper 36 FIG. 10 from 2°-3½ from the side walls 5 and 6 FIG. 3 of the cut.

Figure 11:
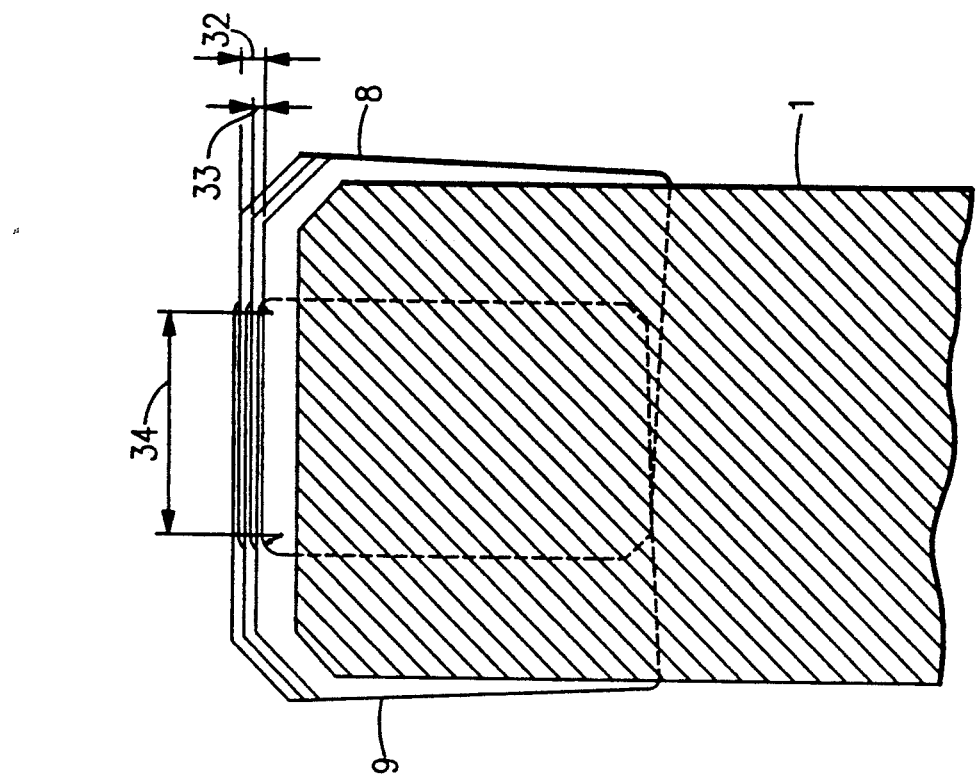

Referring to FIGS. 2 and 10, the right-hand tooth 8 and the left-hand tooth 11 of a pair cutting the same height 16R and 16L, where the rise 17 occurs between each pair of teeth and not from tooth to tooth as is the conventional fashion as shown in FIG. 11. In the referenced conventional arrangement in FIG. 11, the rise 32 is split in half 33 by locating the left-hand tooth midway between the two adjacent right-hand teeth. Thus the chip thickness through the overlap area 34 is half the thickness of the non-overlap areas making the chip less manageable. In this invention as shown in FIG. 10 where each pair of teeth are at the same height 16R and 16L, the lead tooth 8 cuts an essentially uniform chip its full width with the following tooth 11 cutting the remainder of the cut width. Hence, this invention cuts just two manageable chips in the cut width 35 with essentially uniform chip thickness.

Referring to FIG. 12, the effective cut length 37 of the disposable insert in this invention is between 50% and 90% of the broach cut width. Reference FIG. 15 cut length 38, FIG. 18 cut length 39 and 40 FIG. 10.

Further, referring to FIG. 10 the chip formed in length 40 is not more than 90% of the broach cut width.

In this invention, where the width of cut allows it, the pre-sharpened disposable insert height and width are preferably equal, thus allowing the insert to be uni-handed and usable in both right-hand and left-hand stations. For cut widths too narrow or too wide to allow use of the uni-handed insert, both right-hand and left-hand inserts are required.

In a most preferred form of the invention, the hook angle and rake angle are both 12°. The inserts are preferably tungsten carbide.

We claim:

1. In a process of manufacturing a broach which is to hold replaceable cutting inserts wherein said broach has a long axis which is to be moved in a cutting direction along said long axis thereby defining a cutting axis and an elongated broach blank is positioned in a milling machine having a tool axis and being for milling left hand and right hand cutting stations for holding inserts rigidly mounted against support faces at the cutting stations; the improvement wherein the elongated blank is held with its long axis tilted upwardly with respect to a plane normal to the milling tool axis by a hook angle of about 11° to 14° and sequentially milling said support faces with a milling face parallel to the cutting axis.

2. The process of claim 1 wherein a screw centerline for an insert locking wedge is made parallel to an insert support face.

3. The process of claim 1 wherein each support face has a rake angle which is made substantially equal to the hook angle.

4. In a broach which is to hold replaceable cutting inserts and having a long axis which is to be moved in a cutting direction along said axis, said roach having pairs of left hand and right hand cutting stations for holding inserts rigidly mounted against support faces at the cutting stations; the improvement wherein each said support face has a hook angle of about 11° to 14° with respect to said long axis, each support face having a rake angle equal to the hook angle.

5. The broach of claim 4 wherein the insert has a support face parallel to a cutting face.

6. The broach of claim 5 wherein each insert is held in place by a locking wedge bearing on the cutting face and the wedge is held by a locking screw having a centerline, the locking screw centerline being essentially parallel with said cutting face.

7. The broach of claim 6, wherein a corresponding screw hole in the holder also has a centerline that is parallel with the cutting face of the insert, but is spaced approximately 0.005 inches further from the cutting face than is a centerline of a screw hole in the wedge, thus providing a clearance between a wedge face and said cutting face of approximately 0.005 inches when loosening the wedge for insert replacement.

8. The broach of claim 5 wherein the inserts have an effective cut length within a range of between 50% and 90% of a broach cut width.

9. The broach of claim 8, wherein a screw hole in the locking wedge has a centerline which is made parallel with said insert cutting face, and a centerline of a corresponding screw hole in the holder is also made parallel with said insert cutting face, but on an approximately 0.005 inch greater offset from the insert cutting face than is an offset to the wedge screw hole.

10. The broach of claim 4 wherein each said insert has a side taper ranging between 2° and 3½° to correct for insert "walk-out".

11. The broach of claim 10, wherein each said inset has said taper along two adjacent equal length sides, rendering each said insert compatible with both said right hand and left hand cutting stations.

12. In a broach which is to hold replaceable cutting inserts and having a long axis which is to be moved in a cutting direction along said axis, said broach having pairs of left hand and right hand cutting stations for holding inserts rigidly mounted against support faces at the cutting stations; the improvement wherein each said support face has a hook angle of about 11° to 14° with respect to said long axis, pairs of inserts being mounted so that both left hand and right hand inserts of a pair make the same depth of cut.

* * * * *

UNITED STATES PATENT AND TRADEMARK OFFICE
CERTIFICATE OF CORRECTION

PATENT NO. : 5,242,251

DATED : September 7, 1993

INVENTOR(S) : Harold F. ARMSTRONG and Bruce K. BAKAIAN

It is certified that error appears in the above-identified patent and that said Letters Patent is hereby corrected as shown below:

Claim 4, Col. 4, line 68, "roach" should read --broach--.

Signed and Sealed this

Twelfth Day of April, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,242,251
DATED : September 7, 1993
INVENTOR(S) : Harold F. Armstrong & Bruce K. Bakaian It is certified that error appears in the above-indentified patent and that said Letters Patent is hereby corrected as shown below:

Col. 2, line 34, "inset" should be --insert--.
Col. 3, line 11, after "offset" insert --26--.
Col. 3, line 60, after "broached" insert --.--.
Col. 4, line 6, after "would" insert --tend to make the chip curl at
    differing rates along its--.
Claim 11, Col. 6, line 11, "inset" should be --insert--.

Signed and Sealed this

Thirteenth Day of June, 1995

Attest:

BRUCE LEHMAN

Attesting Officer

Commissioner of Patents and Trademarks